United States Patent [19]
Krisher

[11] Patent Number: 5,579,323
[45] Date of Patent: Nov. 26, 1996

[54] VIRTUAL TRIBUTARY/TRIBUTARY UNIT TRANSPORT METHOD AND APPARATUS

[75] Inventor: Dale L. Krisher, Wake Forest, N.C.

[73] Assignee: Alcatel Network Systems, Inc., Richardson, Tex.

[21] Appl. No.: 279,215

[22] Filed: Jul. 22, 1994

[51] Int. Cl.$^6$ ................................. H04J 3/00
[52] U.S. Cl. ................. 370/99; 370/110.1; 370/112
[58] Field of Search ........................... 370/99, 84, 112, 370/60, 94.1, 110.1, 95.3, 105.1

[56] References Cited

U.S. PATENT DOCUMENTS

| | | | |
|---|---|---|---|
| 3,689,699 | 9/1972 | Brenig et al. | 179/15 |
| 5,040,170 | 8/1991 | Upp et al. | 370/94.1 |
| 5,168,494 | 12/1992 | Mueller | 370/99 |
| 5,210,745 | 5/1993 | Guinand et al. | 370/112 |
| 5,267,239 | 11/1993 | Poppischil et al. | 370/94.1 |
| 5,291,485 | 3/1994 | Afify et al. | 370/99 |
| 5,331,670 | 7/1994 | Sorbara et al. | 370/105.1 |
| 5,357,513 | 10/1994 | Kay et al. | 370/95.3 |
| 5,452,306 | 9/1995 | Turudic et al. | 370/112 |

FOREIGN PATENT DOCUMENTS

| | | | |
|---|---|---|---|
| 630773 | 6/1991 | Australia | H04L 5/22 |
| 0432556 | 6/1991 | European Pat. Off. | H04J 3/16 |
| 0565890 | 10/1993 | European Pat. Off. | H04J 3/07 |

OTHER PUBLICATIONS

"Proposed Standard Method for Electrically Interconnecting Sonet Equipment at the VT1.5 Level of Hierarchy", A. Turudic, *ANSI Committee T1 Contribution Document No. T1X1.5/93-008*, Mar. 4, 1993.

"Proposed Text for Electrical VT1.5 Interface Specifications for the Sub STS-1 Standard", B. Smith, *ANSI Committee T1 Contribution Document No. T1X1.5/94-068*, Apr. 25, 1994.

"Ternary Line Codes", J. Buchner, *Philips Telecommunication Review*, vol. 34, No. 2, Jun. 1976, pp. 72-86.

Dale Krisher, "An Electrical VT-1.5 Format and Line Code for DS1," ALCATEL Network Systems (1994).

American National Standard for Telecommunications "Digital Hierarchy–Optical Interface Rates and Formats Specifications (SONET)" (1991).

*Primary Examiner*—Douglas W. Olms
*Assistant Examiner*—Shick Hom
*Attorney, Agent, or Firm*—Ware, Fressola, Van Der Sluys & Adolphson

[57] ABSTRACT

A virtual tributary (VT) or tributary unit (TU) of a selected size is multiplexed with transport overhead and further multiplexed with framing bandwidth of an underlying transport technology for providing a virtual tributary/tributary unit plus transport link overhead plus transport framing for transport on a selected transport technology. This enables individual virtual tributaries/tributary units to be transported with defined line overhead and using existing transport technology framing. Several examples of underlying transport technologies used in conjunction with selected transport formats for VT-1.5 and VT-2 superframes are shown.

22 Claims, 8 Drawing Sheets

VT-1.5

| Transport Format | Transport Symbol Rate (E) | VT-1.5 Bandwidth (Payload+ Pointer) (A) | SONET Transport Overhead Bandwidth (B) | Transport Framing Bandwidth (C) | Total Binary Bandwidth (D) |
|---|---|---|---|---|---|
| DS1 | 1.544 Mbits (Ternary) | 1.728 Mbits | 320 kbits | 8 kbits | 2.056 Mbits |
| HDSL | 1.040 Mbits (2B/1Q) | 1.728 Mbits | 320 kbits | 32 kbits | 2.080 Mbits |
| E1 | 2.048 Mbits (Ternary) | 1.728 Mbits | 192 kbits | 128 kbits | 2.048 Mbits |

| Transport Format | Transport Symbol Rate (E) | VT-2 Bandwidth (Payload+ Pointer) (A) | SONET Transport Overhead Bandwidth (B) | Transport Framing Bandwidth (C) | Total Binary Bandwidth (D) |
|---|---|---|---|---|---|
| E1 | 2.048 Mbits (Ternary) | 2.304 Mbits | 256 kbits | 128 kbits | 2.688 Mbits |
| HDSL | 1.296 Mbits (2B/1Q) | 2.304 Mbits | 256 kbits | 32 kbits | 2.592 Mbits |

FIGURE 7

| Row | 500 microsecond VT-1.5 Superframe | |
|---|---|---|
| | Frame #1 | Frame #2 |
| Link Frame | Transport Framing DS1/E1/HDSL/etc | Transport Framing DS1/E1/HDSL/etc |
| 1 | 1 | Link Quality | H4 |
| 2 | 2 | DCC | DCC |
| 3 | 3 | User/OW(1) | User/OW(1) |
| 4 | 4 | K1 | K1/K2 |
| 5 | 5 | Z1(1) | Z1(1) |
| 6 | 1 | V1 | V2 |
| 7 | 2 | V5 | J2 |
| 8 | 3 | Signal/F/Stuff | Signal/F/Stuff |
| 9 | 4 | Channel #01 | Channel #01 |
| 10 | 5 | Channel #02 | Channel #02 |
| 11 | 6 | Channel #03 | Channel #03 |
| 12 | 7 | Channel #04 | Channel #04 |
| 13 | 8 | Channel #05 | Channel #05 |
| 14 | 9 | Channel #06 | Channel #06 |
| 15 | 10 | Channel #07 | Channel #07 |
| 16 | 11 | Channel #08 | Channel #08 |
| 17 | 12 | Channel #09 | Channel #09 |
| 18 | 13 | Channel #10 | Channel #10 |
| 19 | 14 | Channel #11 | Channel #11 |
| 20 | 15 | Channel #12 | Channel #12 |
| 21 | 16 | Channel #13 | Channel #13 |
| 22 | 17 | Channel #14 | Channel #14 |
| 23 | 18 | Channel #15 | Channel #15 |
| 24 | 19 | Channel #16 | Channel #16 |
| 25 | 20 | Channel #17 | Channel #17 |
| 26 | 21 | Channel #18 | Channel #18 |
| 27 | 22 | Channel #19 | Channel #19 |
| 28 | 23 | Channel #20 | Channel #20 |
| 29 | 24 | Channel #21 | Channel #21 |
| 30 | 25 | Channel #22 | Channel #22 |
| 31 | 26 | Channel #23 | Channel #23 |
| 32 | 27 | Channel #24 | Channel #24 |

FIGURE 4a

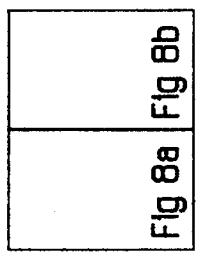
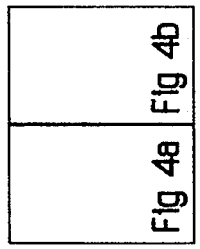
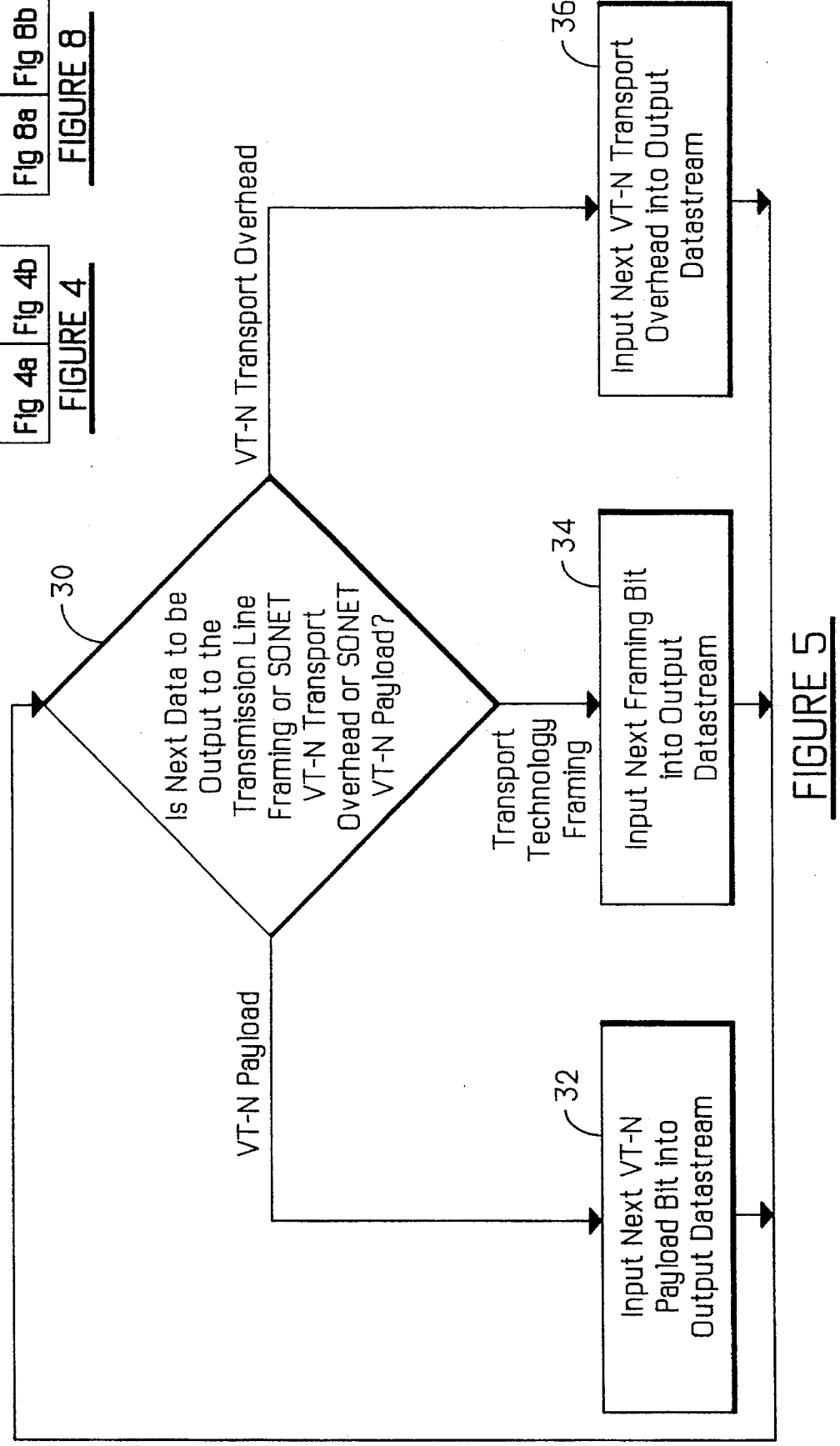
FIGURE 5

| Row | 500 microsecond VT-2 Superframe | |
|---|---|---|
| | Frame #1 | Frame #2 |
| Link Frame | Link Framing E1/HDSL/etc | Link Framing E1/HDSL/etc |

| Row | Link Frame | Frame #1 | Frame #2 |
|---|---|---|---|
| 1 | 1 | Link Quality | H4 |
| 2 | 2 | DCC | DCC |
| 3 | 3 | User/OW | User/OW |
| 4 | 4 | K1 | K1/K2 |
| 5 | 1 | V1 | V2 |
| 6 | 2 | V5 | J2 |
| 7 | 3 | Reserved | Reserved |
| 8 | 4 | Channel #0/R | Channel #0/R |
| 9 | 5 | Channel #01 | Channel #01 |
| 10 | 6 | Channel #02 | Channel #02 |
| 11 | 7 | Channel #03 | Channel #03 |
| 12 | 8 | Channel #04 | Channel #04 |
| 13 | 9 | Channel #05 | Channel #05 |
| 14 | 10 | Channel #06 | Channel #06 |
| 15 | 11 | Channel #07 | Channel #07 |
| 16 | 12 | Channel #08 | Channel #08 |
| 17 | 13 | Channel #09 | Channel #09 |
| 18 | 14 | Channel #10 | Channel #10 |
| 19 | 15 | Channel #11 | Channel #11 |
| 20 | 16 | Channel #12 | Channel #12 |
| 21 | 17 | Channel #13 | Channel #13 |
| 22 | 18 | Channel #14 | Channel #14 |
| 23 | 19 | Channel #15 | Channel #15 |
| 24 | 20 | Channel #16 | Channel #16 |
| 25 | 21 | Channel #17 | Channel #17 |
| 26 | 22 | Channel #18 | Channel #18 |
| 27 | 23 | Channel #19 | Channel #19 |
| 28 | 24 | Channel #20 | Channel #20 |
| 29 | 25 | Channel #21 | Channel #21 |
| 30 | 26 | Channel #22 | Channel #22 |
| 31 | 27 | Channel #23 | Channel #23 |
| 32 | 28 | Channel #24 | Channel #24 |
| 33 | 29 | Channel #25 | Channel #25 |
| 34 | 30 | Channel #26 | Channel #26 |
| 35 | 31 | Channel #27 | Channel #27 |
| 36 | 32 | Channel #28 | Channel #28 |
| 37 | 33 | Channel #29 | Channel #29 |
| 38 | 34 | Channel #30 | Channel #30 |
| 39 | 35 | Channel #31 | Channel #31 |
| 40 | 36 | Reserved | Reserved |

FIGURE 8a

| Frame #3 | Frame #4 | Content |
|---|---|---|
| Link Framing E1/HDSL/etc | Link Framing E1/HDSL/etc | Framing |
| Sync Message | J1 | VT-2 |
| DCC | DCC | Link |
| User/OW | User/OW | Over |
| K1 | K1/K2 | Head |
| V3 | V4 | |
| Z6 | Z7 | |
| Reserved | Reserved | |
| Channel #0/R | Channel #0/R | |
| Channel #01 | Channel #01 | |
| Channel #02 | Channel #02 | |
| Channel #03 | Channel #03 | |
| Channel #04 | Channel #04 | |
| Channel #05 | Channel #05 | |
| Channel #06 | Channel #06 | |
| Channel #07 | Channel #07 | |
| Channel #08 | Channel #08 | |
| Channel #09 | Channel #09 | |
| Channel #10 | Channel #10 | |
| Channel #11 | Channel #11 | |
| Channel #12 | Channel #12 | |
| Channel #13 | Channel #13 | SONET |
| Channel #14 | Channel #14 | VT-2 |
| Channel #15 | Channel #15 | |
| Channel #16 | Channel #16 | |
| Channel #17 | Channel #17 | |
| Channel #18 | Channel #18 | |
| Channel #19 | Channel #19 | |
| Channel #20 | Channel #20 | |
| Channel #21 | Channel #21 | |
| Channel #22 | Channel #22 | |
| Channel #23 | Channel #23 | |
| Channel #24 | Channel #24 | |
| Channel #25 | Channel #25 | |
| Channel #26 | Channel #26 | |
| Channel #27 | Channel #27 | |
| Channel #28 | Channel #28 | |
| Channel #29 | Channel #29 | |
| Channel #30 | Channel #30 | |
| Channel #31 | Channel #31 | |
| Reserved | Reserved | |

FIGURE 8b

VIRTUAL TRIBUTARY/TRIBUTARY UNIT TRANSPORT METHOD AND APPARATUS

TECHNICAL FIELD

This invention relates to telecommunications and, more particularly, to defining transport of individual virtual tributaries or tributary units.

BACKGROUND OF THE INVENTION

A problem is that the current deployment of Synchronous Optical Network (SONET)/Synchronous Digital Hierarchy (SDH) in North America, Europe and elsewhere is primarily limited to routes where optical fibers exist between communicating SONET/SDH Network Elements. Due to the cost of installing a fiber optic infrastructure, these SONET/SDH routes are found primarily between telephone central offices where the cost of deploying the SONET/SDH optic infrastructure results in the greatest benefit. The result of this economic reality is that there is a large number of electrical transmission links making up the telephony access infrastructure, which could benefit from the additional capabilities provided by the SONET/SDH format, but for which the cost of replacing the existing electrical transmission links with optic fiber cannot be cost justified.

A proposed standard method for electrically interconnecting SONET equipment at the VT 1.5 level of the SONET hierarchy has been suggested by A. Turudic in the ANSI T1 Committee Contribution Document Number T1X1.5/93-008 dated Mar. 4, 1993. A mechanism is there proposed for interconnecting SONET equipment islands with a copper based network using electrical VT 1.5 for transport using a CEPT PCM-30 format as the electrical interface. A second proposal, using a 1.728 Mb/s electrical interface is shown in Committee T1 Contribution Document Number T1X1.5/94/068 dated Apr. 25, 1994. That proposal specifies a nominal line rate of 1.728 Mb/s using bipolar 8-zero substitution (B8ZS) on a balanced twisted pair. Essentially, the DS-1 bit rate is increased significantly to accommodate the VT 1.5 bandwidth.

However, these proposals are at the sacrifice of electrical compatibility with the existing DS-1 infrastructure for increased payload and as yet there has been no format agreed upon for transporting individual virtual tributaries or tributary units, particularly of size VT-1.5 and of size VT-2/TU-12.

DISCLOSURE OF INVENTION

An object of the present invention is to define a method and apparatus for transport of individual virtual tributaries or tributary units for various media.

Another object of the present invention is to provide a transport technique and apparatus for transporting individual virtual tributaries of size VT 1.5 and tributary units of size TU 12.

According to the present invention, a virtual tributary payload of size VT-N is multiplexed with a VT-N transport link overhead signal for providing a VT-N payload plus transport link overhead signal which is in turn multiplexed with the transport technology framing signal, for providing a VT-N payload plus transport link overhead plus transport technology framing signal.

In further accord with the present invention, the size VT-N is size VT-1.5. In such a case, the VT-1.5 payload has a bandwidth of 1.728 Mbits.

In still further accord with the present invention, for a virtual tributary of size VT-1.5, the transport link overhead may have a bandwidth of 320 kilobits, the transport technology being DS-1 and the DS-1 framing signal having a bandwidth of 8 kilobits. In that case, the VT-1.5 payload plus transport link overhead plus DST-1 framing signal has a binary bandwidth of 2.056 Mbits for transport on a DS-1 line at a ternary symbol rate of 1.544 Mbits per second.

In accordance still further with the present invention, for a virtual tributary of size VT-1.5, the overhead signal can have a bandwidth of 320 kilobits with HDSL transport technology having a framing signal with a bandwidth of 32 kilobits. In that case, the VT-1.5 payload plus transport link overhead plus HDSL framing signal has a binary bandwidth of 2.080 Mbits for transport on an HDSL line at a 2B/1Q symbol rate of 1.040 Mbits per second.

According still further to the present invention, for a virtual tributary of size VT-1.5, the transport link overhead signal can have a bandwidth of 192 kilobits for a transport technology that is E1, wherein the E1 framing/CRC/signaling signal has a bandwidth of 128 kilobits. In that case, the VT-1.5 payload plus transport link overhead plus E1 framing signal has a binary bandwidth of 2.048 Mbits for transport on an E1 line at a ternary symbol rate of 2.048 Mbits per second.

According further to the present invention, SONET VT-1.5 payload and overhead is transported in a 500 microsecond superframe. This superframe is located using a combination of the framing and H4 overhead. The 500 microsecond superframe of the prior art is preserved in the present invention and the location of its boundaries are defined by the framing word and a modified H4 indication.

According to the present invention, the 1.728 Mbit bandwidth of the SONET VT-1.5 is multiplexed into a 2.056 Mbit total binary bandwidth for transport on a DS-1, a 2.080 Mbit total binary bandwidth for transport on an HDSL link, or a 1.920 Mbit total binary bandwidth for transport on an E1 link. Some of the bandwidth is defined for transmission link overhead. This transmission link overhead has capabilities consistent with the overhead of other defined SONET links. This consistency between both the SONET payload and the SONET overhead capabilities between existing SONET link formats and the VT-1.5 format described in this disclosure provide the ability for the cost effective, seamless extension of SONET capabilities throughout any of the telecommunications infrastructure capable of supporting 1.728 Mbits of payload bandwidth VT-1.5. Using a combination of existing and new digital transmission technologies which can operate on this existing access infrastructure, there are existing facilities in the world's telecommunications infrastructure which can support such payloads. Specifically, the 2.048 Mbit ITU E1, the 2.080 Mbit HDSL, the coded DS1 format of the invention as disclosed in copending application Ser. No. 08/279,197, as well as various optic links which can handle such payload capacities.

To be described in more detail below is a format for a VT-1.5 SONET transport format that may be used according to the invention. The format uses a 500 μsec superframe of four frames, each frame organized on a column comprising underlying transport technology framing, VT-1.5 link overhead and SONET VT-1.5 payload comprising 24 channels, plus VT overhead and pointer. The frames are illustrated in four side-by-side columns, with the framing first, then the link overhead and followed by the payload. Each frame has five bytes of link overhead and 27 bytes of VT 1.5. The bytes can be transmitted top to bottom for each column 1–4. Of course, other organizations of the frame are possible.

The invention thus provides a format which can transport an intact SONET VT-1.5 along with SONET transmission link overhead on a selected electrical or optical digital transmission link. The definition of this VT-1.5 format for the telephony access environment, especially the existing electrical infrastructure capable of supporting DS1, E1 and HDSL, will allow the extension of the SONET environment, and its additional capabilities, throughout almost the entire existing electrical (and optical) telecommunications infrastructure.

In further accord with the present invention, the size of the virtual tributary/tributary unit is size VT-2/TU-12.

In still further accord with the present invention, the virtual tributary/tributary unit VT-2/TU-12 datastream has a bandwidth of 2.304 Mbits.

According still further to the present invention, the VT-2/TU-12 transport link overhead signal has a bandwidth of 256 kilobits, the transport technology is E1, and the E1 framing signal has a bandwidth of 128 kilobits, wherein the VT-2/TU-12 payload plus transport link overhead plus E1 framing signal has a binary bandwidth of 2.688 Mbits for transport on an E1 line at a ternary symbol rate of 2.048 Mbits per second.

In accordance still further with the present invention, the VT-2/TU-12 transport link overhead signal has a bandwidth of 256 kilobits, the transport technology is HDSL, and the HDSL framing signal has a bandwidth of 32 kilobits, and wherein the VT-2/TU-12 payload plus transport link overhead plus HDSL framing signal has a binary bandwidth of 2.592 Mbits for transport on an HDSL line at a 2B/1Q symbol rate of 1.296 Mbits per second.

Thus, similar to the case for VT-1.5s, according to the present invention, the 2.304 Mbit bandwidth of the SONET VT-2/SDH TU-12 is mapped into an existing transmission bandwidth of sufficient capacity for transporting individual tributary units of size TU-12. Additional bandwidth is defined, according to the underlying transport technology used, for transmission link overhead. This transmission link overhead has capabilities consistent with the overhead of other defined repeaterless SONET/SDH links. This consistency between both the SONET/SDH payload and the SONET/SDH overhead capabilities between existing SONET/SDH link formats and the VT-2/TU-12 format described in this disclosure provide the ability for the cost effective, seamless extension of SONET/SDH capabilities throughout any of the telecommunications infrastructure capable of supporting the required payload bandwidth. Using a combination of existing and new digital transmission technologies which can operate on this existing access infrastructure, there are existing facilities which can support such payloads. Specifically, the coded E1 format of the invention as disclosed in the above-mentioned copending application, optic links and HDSL each of which have the required payload capacity.

To be described in more detail below is a transport format for VT-2 SONET/SDH according to the present invention. The bytes are arranged in a 500 μsec superframe similar to the above-described VT-1.5 superframe and are also transmitted top to bottom for each 125 μsec frame in columns 1–4.

Thus, as for the case of virtual tributaries of size VT-1.5, according further to the present invention, SONET/SDH VT-2/TU-12 payload and overhead is transported in a 500 microsecond superframe. This superframe is located using a combination of the framing and H4 overhead. The 500 microsecond superframe of the prior art is preserved in the present invention and the location of its boundaries are defined by the framing word and a modified H4 indication.

Thus, the present invention also describes a format which can transport an intact SONET/SDH VT-2/TU-12 payload along with SONET/SDH transmission link overhead on an electrical or optical digital transmission link. The definition of this VT-2/TU-12 format for the telephony access environment, especially the existing electrical infrastructure capable of supporting E1 and HDSL, will allow the extension of the SONET/SDH environment, and its additional capabilities, throughout almost the entire existing electrical (and optical) telecommunications infrastructure.

Specific benefits of the SONET VT 1.5 and SONET/SDH VT-2/TU-12 transmission formats are:
1. The ability to transport a complete, unmodified VT-1.5 or VT-2/TU-12 payload along with its overhead and pointer (V1–V8).
2. The ability to carry SONET or SONET/SDH synchronization information, as well as synchronization quality messages (this is not currently possible using DS1 or E1 signals which have traversed SONET/SDH transmission links). This is possible because the SONET VT-1.5 or SONET/SDH VT-2/TU-12 pointer mechanism is extended through the transmission link and therefore the link line rate can be referenced to the local, high quality, SONET/SDH network element clock.
3. The ability to support the SONET/SDH pointer mechanism.
4. The ability to support SONET/SDH compatible transmission link and path performance monitoring information. This includes link BIP-2 and link FERF as well as link RDI.
5. The ability to support an OAM&P channel, commonly known in SONET/SDH as the DCC channel.
6. The ability to support a user defined channel or an orderwire channel.
7. The ability to support the H4 Multiframe indication necessary to locate the 500 microsecond VT-1.5 or VT-2/TU-12 superframe.
8. The ability to support Automatic Protection Switching channel(s) (K1 or K1/K2).
9. The ability to support a link trace (J1).

These and other objects, features and advantages of the present invention will become more apparent in light of the following detailed description of a best mode embodiment thereof, as illustrated in the accompanying drawing.

BRIEF DESCRIPTION OF THE DRAWING

FIG. 2 describes the signals shown in FIG. 1 for the case where a virtual tributary of size VT-1.5 is assembled for transport on various underlying transport technologies, according to the present invention.

FIGS. 4a–b shows the relation between FIGS. 4a and 4b. FIGS. 4a and 4b together show a 500 microsecond VT-1.5 superframe, according to the present invention.

FIG. 5 shows a method, according to the present invention, for providing a VT-N payload plus transport link overhead plus transport framing bandwidth functions in a datastream, according to the present invention.

FIG. 7 shows a table similar to FIG. 2 except for a virtual tributary of size VT-2 (which is the same as a tributary unit of size TU-12) and which, according to the present invention, can be transported on various known underlying transport technologies including E1 and HDSL.

FIGS. 8a–b shows the relation between FIGS. 8a and 8b. FIGS. 8a and 8b together show a 500 microsecond VT-2/TU-12 superframe, according to the present invention.

BEST MODE FOR CARRYING OUT THE INVENTION

Figure 1:
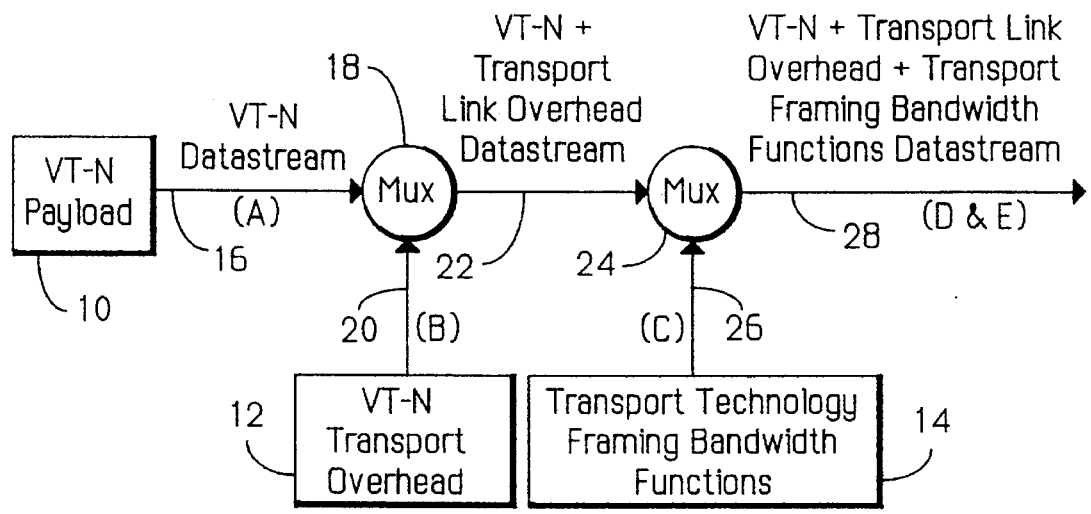
FIG. 1 shows an apparatus, according to the present invention, for providing an individual virtual tributary (or tributary unit) plus transport link overhead plus transport technology framing bandwidth functions in a datastream.

FIG. 1 shows means for transporting an individual virtual tributary (VT) of size N (N), according to the present invention, as having three components, i.e., a payload component 10, a transport link overhead component 12, and a transport framing bandwidth component 14 associated with the underlying transport technology. "Virtual tributaries", as defined by ANSI Specification T1.105, have their counterparts in "tributary units" as defined by CCITT. A VT-2 is the same as a TU-12, for example. Although FIG. 1 uses the "VT" nomenclature, it should be understood that the description applies to tributary units (TUs) as well. The VT-N payload 10 is provided as a VT-N datastream on a line 16 to a multiplexer 18 that multiplexes the VT-N datastream on the line 16 with a VT-N transport overhead signal on a line 20. The multiplexer 18 provides a multiplexed VT-N plus transport link overhead datastream signal on a line 22 to a second multiplexer 24 that is also responsive to a transport technology framing signal on a line 26 for providing a VT-N payload plus VT-N transport link overhead plus transport framing signal on a line 28. Two examples of VT/TU sizes that can be used, according to the present invention, are given below but it should be realized that the invention can apply to other sized virtual tributaries and tributary units as well.

FIG. 2 shows how three different transport technologies can be used to transport a virtual tributary of size VT-1.5 (TU-11). The table shown in FIG. 2 is arranged in six columns, the leftmost of which lists the three underlying transport technologies that are illustrated, according to the present invention, for transporting VT-1.5 virtual tributaries. The next column is labelled "E" and corresponds to the transport symbol rate of the signal on the line 28 of FIG. 1 for each of the three technologies. The next column, labelled "A" shows the VT-1.5 bandwidth plus payload pointer bandwidth corresponding to the signal on the line 16 in FIG. 1. The next column is labelled "B" and lists the SONET transport overhead bandwidth provided on the line 20 of FIG. 1. The next column, labelled "C" lists the various transport framing bandwidths for the underlying technologies provided, according to the present invention and corresponds to the signal on the line 26, for being input to the multiplexer 24 with the combined bandwidth listed in columns A & B. The total binary bandwidth (which is usually not transported in binary form) is listed in the rightmost column labelled "D" for the three underlying transport technologies and corresponds to the signal on the line 28.

Figure 3:
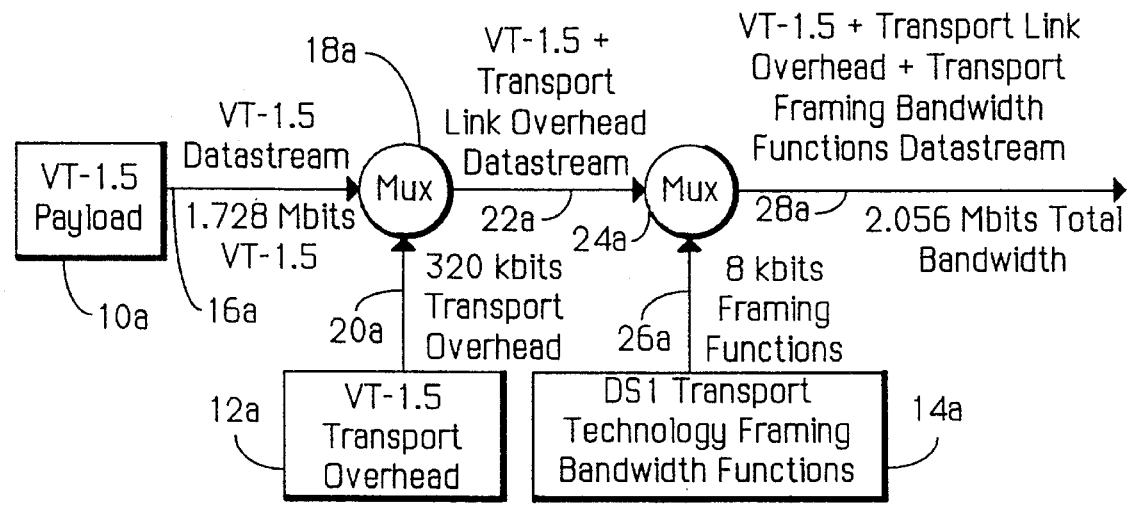
FIG. 3 shows a specific example taken from FIG. 2 of the signals of FIG. 1 for DS-1 transport technology, according to the present invention.

As a concrete example selected from the first row of FIG. 2 as applied to FIG. 1, FIG. 3 shows a use of an underlying DS1 transport technology, according to the present invention. A VT-1.5 payload 10a is shown in FIG. 3 being provided as a VT-1.5 datastream on a line 16a having a bandwidth of 1.728 Mbits, corresponding to the payload of VT-1.5 virtual tributaries, i.e., each tributary having 27 bytes per frame, for a total of 108 bytes intended as part of a 500 microsecond VT-1.5 superframe to be formed by multiplexers 18a, 24a in conjunction with transport overhead and framing functions.

Figure 4B:
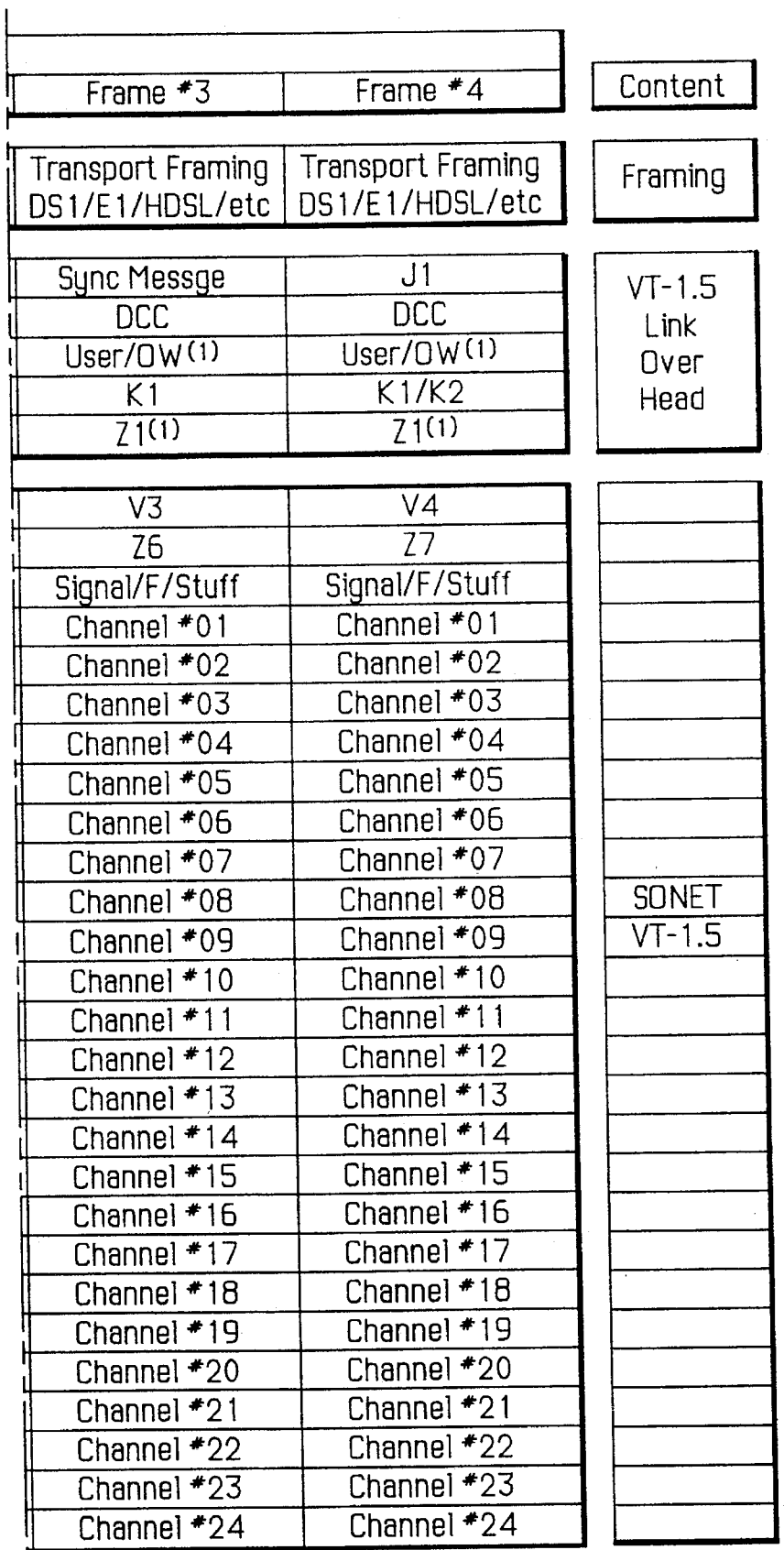

FIGS. 4a and 4b together show such a 500 microsecond VT-1.5 superframe, according to the present invention, for being carried on one of the underlying transport technologies listed in FIG. 2. Such would be provided by the multiplexer 24a of FIG. 3 on a line 28a as a datastream organized as shown in FIGS. 4a and 4b transported beginning with frame 1 from top to bottom and continuing through frames 2–4 in the same manner.

It will be observed that the frames of FIGS. 4a and 4b are broken into three distinct groups having different content as listed in the rightmost column. These different content groups comprise SONET VT-1.5 payload such as the payload 10a of FIG. 3 provided on the line 16a, VT-1.5 link overhead such as the VT-1.5 transport overhead 12a of FIG. 3 provided on the line 20a to the multiplexer 18a, and framing such as the DS1 transport technology framing bandwidth provided as in a block 14a of FIG. 3 and as further provided on a line 26a to the multiplexer 24a.

The operation of the devices of FIG. 3 are such that the VT-1.5 payload provided as a datastream on the line 16a is multiplexed with the 320 kilobits of transport overhead shown in the DS1 row of FIG. 2 in the column labelled "B" and in the middle content group of FIGS. 4a and 4b labelled "VT-1.5 link overhead." This results in VT-1.5 payload plus transport link overhead being multiplexed into a combined datastream on a line 22a provided to the multiplexer 24a for further multiplexing with eight kilobytes of framing from the underlying DS1 transport technology. As known in the art, DS1 transport technology is organized in 193 bit frames of 125 microseconds each. The 193rd bit is a framing bit while the other 192 bits are payload carrying 192 data bits, normally arranged as 24 8-bit bytes or channels. The DS1 transport technology is an accepted building block in North America and elsewhere and transports information at the basic rate of 1.544 Mbits per second (ternary) which also corresponds to a binary bandwidth in the prior art of 1.544 Mbits. According to the invention shown and described in connection with copending application Ser. No.08/279,197, the VT-1.45 plus transport link overhead datastream on the line 22a can be encoded according to a four binary bit/three ternary bit coding scheme (4B3T) and multiplexed with the eight kilobits of DS1 framing on the line 26a encoded according to a separate, one binary bit/one ternary bit (1B1T) coding function in order to provide a total 2.056 megabits of total binary bandwidth on the line 28a. According to that method of encodement and multiplexing, the individual frames of FIGS. 4a and 4b will each be wholly contained within a DS1 frame. That patent application, particularly FIGS. 8–13 and the accompanying text thereof is hereby expressly incorporated by reference for background.

Referring back to FIG. 2, a specific example of a DS1 transport format used to transport individual VT-1.5's has been shown in connection with FIG. 3. Similar examples could be given for utilizing underlying HDSL or E1 transport technology but, using the teachings hereof, such would be evident to one of skill in the art and will not be repeated here.

Figure 6:
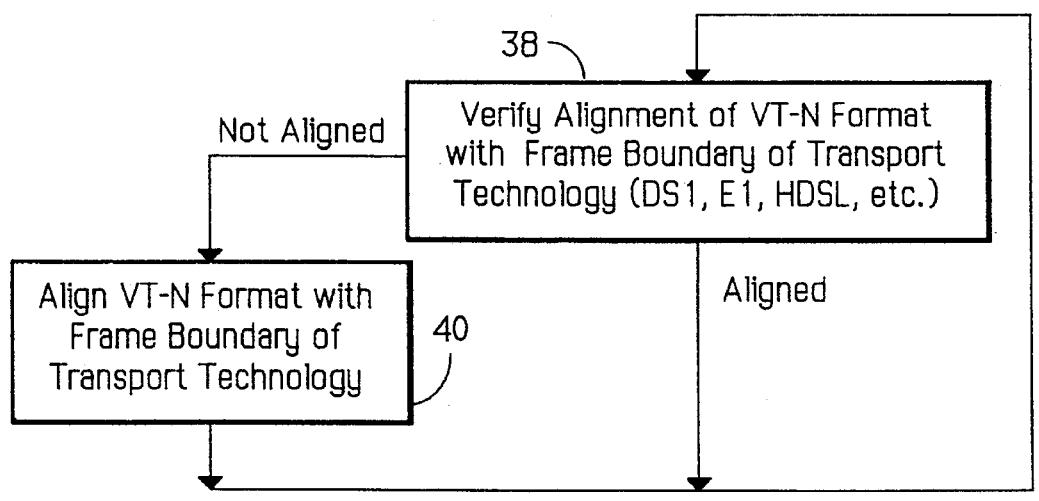
FIG. 6 shows a verification of alignment of VT-N format of the present invention with the frame boundary of the underlying transport technology, according to the present invention and correction thereof, if not aligned.

Referring now to the method of FIG. 5, according to the present invention, the apparatus of FIG. 1 can also be represented as a method of providing a VT-N plus transport link overhead plus transport framing bandwidth on the underlying transport technology on the line 28. As shown in FIG. 5, such a method comprises a repetitive decision as represented in a decision block 30 wherein it is determined whether the next data to be output on the line 28 of FIG. 1 is framing of the underlying transport technology, or SONET VT-N transport overhead or SONET VT-N payload. If payload, a step 32 is executed in which the next VT-N payload bit is provided onto the output datastream on the line 28 of FIG. 1. If the decision block 30 determines that the next data to be output is transport technology framing, a step 34 is next executed in which the next framing bit is obtained and provided on the line 28. Similarly, if step 30 determines that the next data to be output is transport overhead, a step 36 is executed in which a next VT-N transport overhead bit is output onto the datastream on the line 28. As illustrated in FIG. 6, in general, the frame boundaries of the transport technology must be aligned with the VT-N format. This is shown being verified in a step 38 and, if not aligned, corrected in a step 40. This may be carried out by hardware, software or a combination thereof as will be evident to one of skill in the art.

Turning now to FIG. 7, a table similar to the table of FIG. 2 is shown except for a virtual tributary of size VT-2. It should be understood that this same virtual tributary size is used in Europe under the nomenclature "Tributary Unit" of size TU-12. The table of FIG. 7 shows the possibility of using two existing underlying transport technologies for transporting a VT-2/TU-12 organized as shown in FIGS. 8a and 8b, for example. It should be realized that the precise organization shown in FIGS. 8a and 8b, as well as FIGS. 4a and 4b, can be changed around according to design choice. However, the overall structure and capability of four frames of tributary units or virtual tributaries in a four frame superframe with underlying technology framing, link overhead and payload will be the same.

The table of FIG. 7 should be viewed in conjunction with FIG. 1 which again shows the same letters A–E which are represented in the columns of FIG. 7 in the same way as in FIG. 2. Thus, for an underlying E1 transport format the transport symbol rate is 2.048 Mbits (ternary) on the line 28 of FIG. 1. This may carry a total binary bandwidth of 2.688 Mbits according to the same special coding technique described in the copending application mentioned above, especially in connection with FIGS. 8, 10, 12–15 thereof and the accompanying text which are hereby incorporated by reference for background.

The third column of FIG. 7 shows the VT-2 payload on the line 16 of FIG. 1 as comprising, for E1, 2.304 Mbits. The SONET transport overhead bandwidth column (B) for E1 shows 256 kbits and would be provided on the line 20 of FIG. 1 to be multiplexed with the payload of column A on the line 16 in the multiplexer 18. The combined VT2 and transport link overhead on the line 22 of FIG. 1 is multiplexed with 128 kilobytes of E1 transport framing/CRC/ signaling bandwidth as shown on the line 26 of FIG. 1 thereby providing the VT2 plus transport link overhead plus transport framing bandwidth on the line 28 of FIG. 1.

A description using an underlying HDSL transport format for transporting virtual tributaries of size VT-2 or tributary units of size TU12 in a similar manner as the above described use of E1 transport technology will not be given here as such will be evident to one of skill in the art using the teachings hereof.

As just mentioned, according to the present invention, the 1.728 Mbit bandwidth of a SONET VT-1.5 virtual tributary may be multiplexed into a 2.048 Mbit transmission bandwidth such as shown in the lower part of FIGS. 4a and 4b, i.e., corresponding to a VT-1.5 shown in four frames arranged as columns and occupying 27 rows corresponding to rows 6–32 in FIGS. 4a and 4b. FIGS. 4a and 4b are just an illustration of one way to map a VT-1.5 virtual tributary into a 500 microsecond superframe of 2.048 Mbit bandwidth. The additional 320 kilobytes are defined for transmission link overhead. In other words, the organization of the superframe need not be as shown, the main point being that a SONET VT-1.5 transport format is multiplexed into a transmission bandwidth with link overhead having capabilities consistent with the overhead of other defined SONET links. This consistency between both the SONET payload and the SONET overhead capabilities between existing SONET link formats and the VT-1.5 format shown in FIGS. 4a and 4b provides the ability for a cost effective, seamless extension of SONET capabilities throughout the telecommunications infrastructure capable of supporting such payload bandwidth. The bytes shown in FIGS. 4a and 4b may but need not be transmitted top to bottom for each column 1–4.

From the foregoing it should be realized that the invention describes a framed format which is capable of transporting two sets of telecommunications information sets. The first being an intact SONET VT-1.5, including the SONET VT-1.5 pointer and other SONET VT-1.5 path overhead bytes. This first set of information is the payload of the VT-1.5 transport format described in this specification and represents the payload which is intended to be delivered between the ends of the whole SONET VT-1.5 path. This format exists in the art and the format itself is not the subject of this invention. This specification does disclose and claim, however, with respect to the existing SONET VT-1.5 format, the insertion of this SONET VT-1.5 in the various bandwidths shown herein. The second set of information being a group of transport link overhead which performs the functions specific to the transmission link that a SONET VT-1.5 payload is traversing.

Similarly, for the European context, this invention describes a framed format which is capable of transporting two sets of telecommunications information sets. The first being an intact SONET/SDH VT-2/TU-12, including the SONET/SDH VT-2/TU-12 pointer and other SONET/SDH VT-2/TU-12 path overhead bytes. This first set of information is the payload of the VT-2/TU-12 transport format described in this patent specification and represents the payload which is intended to be delivered between the ends of the whole SONET/SDH VT-2/TU-12 path. Again, this format exists in the art and the format itself is not the subject of this invention. This specification does disclose and claim, with respect to the existing SONET/SDH VT-2 format, however, the insertion of this SONET/SDH VT-2/TU-12 in the various bandwidths shown herein. The second being a group of transport link overhead which performs the functions specific to the transmission link that a SONET/SDH VT-2 payload is traversing.

This disclosure further describes in FIGS. 8a and 8b the location of a framing byte in each 125 microsecond frame. This exact framing byte may be different depending on the specific digital transmission technology being used as the transport link. Specifically, if a VT-1.5 is being transported via a 2.048 Mbit E1 link, a known E1 framing/CRC/signaling word may be substituted for the SONET A1 and A2 framing words. Similarly, if the VT-2 is being transported via a 2.688 Mbit E1 link, the known E1 framing/CRC/signaling word may be substituted for the SONET/SDH A1 and A2 framing words. Therefore, both the location of the framing word(s) and the fact that there may be more than one framing word(s) pattern is encompassed by the claims of this invention.

Figure 9:
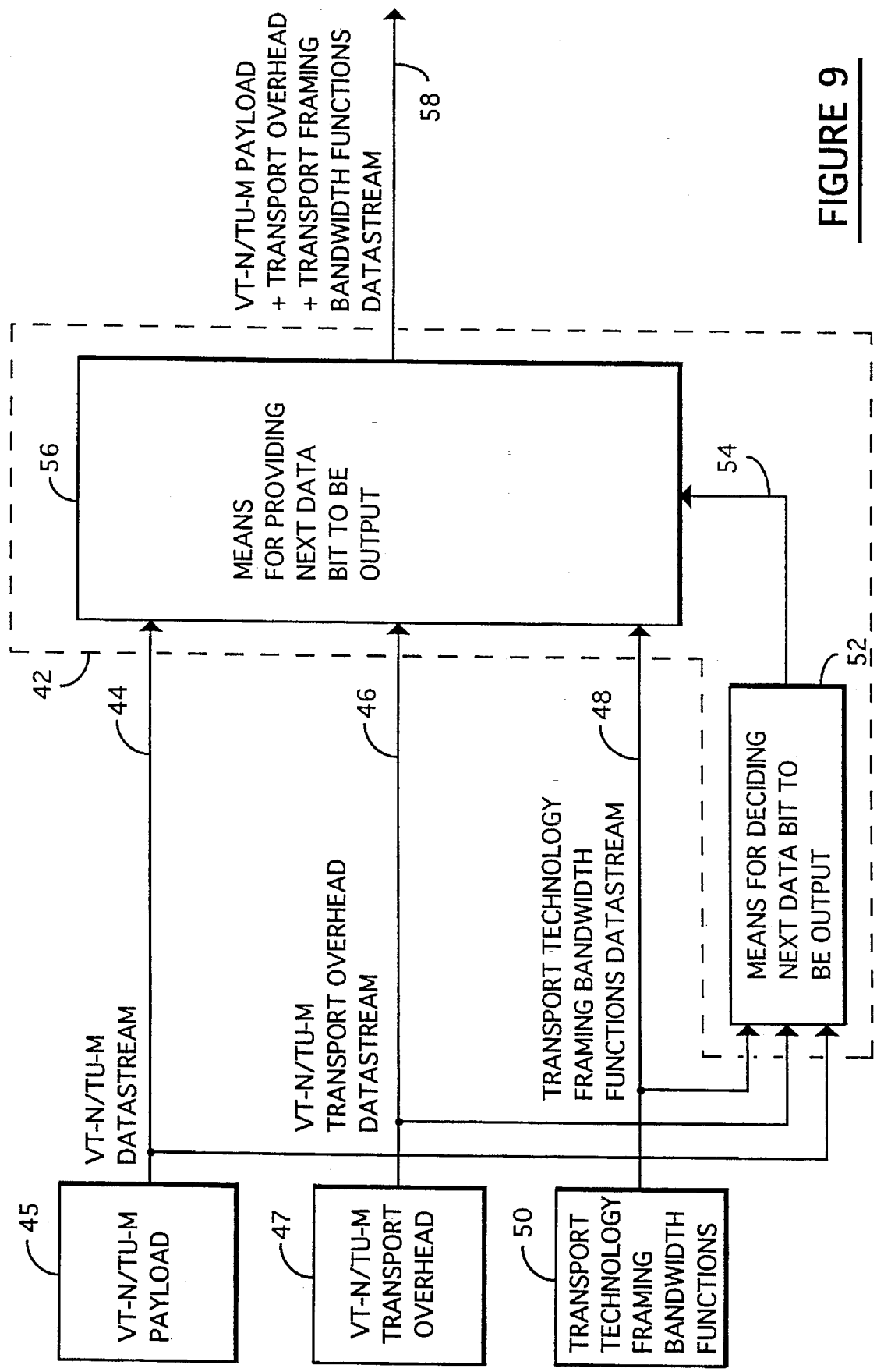
FIG. 9 shows another apparatus, similar to that shown in FIG. 1, for providing a VT-N/TU-M payload plus transport overhead plus transport framing datastream signal for being transported as individual virtual tributaries/tributary units with defined transport overhead and underlying transport technology framing.

FIG. 9 shows an apparatus 42, according to the present invention. The apparatus 42 is responsive to a VT-N/TU-M datastream on a line 44 provided by a source 45 of VT-N/TU-M payload information. It is also responsive to a VT-N/TU-M transport overhead datastream on a line 46 from a source 47 of VT-N/TU-M transport overhead information. Finally, it is responsive to a transport technology framing bandwidth function datastream on a line 48 from a source 50 of transport technology framing bandwidth functional information.

The apparatus 42 comprises two elements in combination, both of which are responsive to the abovementioned datastream signals on the lines 44, 46, 48. A means 52 monitors the signals on the lines 44, 46, 48 and is used to control the order for transmission of said signals, for deciding a next data bit to be output in the same manner as already described in connection with FIG. 5. It provides a decision signal on a line 54 to a means 56 which provides a next bit on a line 58 selected from among the datastream signals on the lines 44, 46, 48 according to the decision signal on the line 54. The signal on the line 58 is a VT-N/TU-M payload plus transport overhead plus transport framing bandwidth functions datastream signal similar to the signal on the line 28 of FIG. 1. The means 56 thus performs the function described previously in connection with FIG. 5 as carried out in the steps 32, 34, 36.

It should be realized that the order of the transmission of the components of the output datastream 58 may be modified or changed as a matter of design choice, and such changes are certainly within the scope of the present invention.

Although the invention has been shown and described with respect to a best mode embodiment thereof, it should be understood by those skilled in the art that the foregoing and various other changes, omissions and additions in the form and detail thereof may be made therein without departing from the spirit and scope of the invention.

I claim:

1. Apparatus, comprising:
   a first multiplexer (18), responsive to a payload datastream signal (16) for a Synchronous Optical Network (SONET) virtual tributary (VT) of size N (VT-N) where N=1.5 or 2 and responsive to a SONET VT-N transport link overhead signal (20), for providing a SONET VT-N payload plus SONET transport link overhead signal (22); and
   a second multiplexer (24), responsive to said SONET VT-N payload plus SONET transport link overhead signal (22) and to a transport technology framing signal (26), for providing a SONET VT-N payload plus SONET transport link overhead plus transport technology framing signal (28).

2. The apparatus of claim 1, wherein the size VT-N is size VT-1.5.

3. The apparatus of claim 2, wherein the VT-1.5 datastream signal (16) has a bandwidth of 1.728 Mbits.

4. The apparatus of claim 3, wherein the VT-1.5 transport link overhead signal has a bandwidth of 320 kbits, the transport technology is DS-1 and the DS-1 framing signal has a bandwidth of 8 kbits, and the VT-1.5 payload plus transport link overhead plus DS-1 framing signal has a binary bandwidth of 2.056 Mbits for transport on a DS-1 line at a ternary symbol rate of 1.544 Mbits per second.

5. The apparatus of claim 3, wherein the VT-1.5 transport link overhead signal has a bandwidth of 320 kbits, the transport technology is HDSL and the HDSL framing signal has a bandwidth of 32 kilobits, and the VT-1.5 payload plus transport link overhead plus HDSL framing signal has a binary bandwidth of 2.080 Mbits for transport on an HDSL line at a 2B/1Q symbol rate of 1.040 Mbits per second.

6. The apparatus of claim 3, wherein the VT-1.5 transport link overhead signal has a bandwidth of 192 kbits, the transport technology is E1 and the E1 framing signal has a bandwidth of 128 kbits, and the VT-1.5 payload plus transport link overhead plus E1 framing signal has a binary bandwidth of 2.048 Mbits for transport on an E1 line at a ternary symbol rate of 2.048 Mbits per second.

7. The apparatus of claim 1, wherein the size VT-N is size VT-2/TU-12.

8. The apparatus of claim 7, wherein the VT-2/TU-12 datastream signal (16) has a bandwidth of 2.304 Mbits.

9. The apparatus of claim 8, wherein the VT-2/TU12 transport link overhead signal has a bandwidth of 256 kilobits, the transport technology is E1 and the E1 framing signal has a bandwidth of 128 kilobits, and the VT-2/TU-12 payload plus transport link overhead plus E1 framing signal has a binary bandwidth of 2.688 Mbits for transport on an E1 line at a ternary symbol rate of 2.048 Mbits per second.

10. The apparatus of claim 8, wherein the VT-2/TU12 transport link overhead signal has a bandwidth of 256 kilobits, the transport technology is HDSL and the HDSL framing signal has a bandwidth of 32 kilobits, and the VT-2/TU-12 payload plus transport link overhead plus HDSL framing signal has a binary bandwidth of 2.592 Mbits for transport on an HDSL line at a 2B/1Q symbol rate of 1.296 Mbits per second.

11. A method, comprising the steps of:
   (a) determining a next data signal for transmission as transport framing of a transport medium, or Synchronous Optical Network (SONET) transport overhead for a virtual tributary (VT) or VT payload;
   (b) providing said next data signal for transmission determined in step (a); and
   (c) repeating steps (a) and (b) cyclicly wherein said transport framing plus said SONET transport overhead for a VT, plus said VT payload is transmitted over the transport medium.

12. The method of claim 11, wherein said VT payload signal comprises a VT of size N (VT-N) where N equals 1.5 or 2, and in the event that said next data signal is determined in step (a) to be a framing signal, said method further comprises the steps of:
   (a)(i) checking alignment of the VT-N with a frame boundary of the transport medium as indicated by the transport framing data signal;
   (a)(ii) aligning the VT-N with the frame boundary of the transport medium when misaligned; and
   (a)(iii) executing step (b).

13. Apparatus (42) for processing a virtual tributary (VT) data stream of size N (VT-N), where N=1.5 or 2, or for processing a tributary unit (TU) data stream of size M (TU-M), where M=11 or 12, said apparatus comprising:

means (52), responsive to said VT-N or TU-M (VT-N/TUTM) datastream (44), to a VT-N/TU-M transport overhead datastream (46), and to a transport medium framing functions datastream (48), for providing a decision signal (54) indicative of a next bit to be output on a transport medium; and means (56), responsive to said decision signal (54), to said VT-N/TU-M datastream (44), to the VT-N/TU-M transport overhead datastream (46), and to said transport medium framing functions datastream (48), for providing a VT-N/TU-M payload plus transport overhead plus transport framing functions datastream (58) for transport on the transport medium.

14. The apparatus of claim 13, wherein the size VT-N is size VT-1.5.

15. The apparatus of claim 14, wherein the VT-1.5 datastream (44) has a bandwidth of 1.728 Mbits.

16. The apparatus of claim 15, wherein the VT-1.5 transport overhead datastream has a bandwidth of 320 kbits, the transport medium is DS-1 and the DS-1 framing functions datastream (58) has a bandwidth of 8 kbits, and the VT-1.5 payload plus transport overhead plus DS-1 framing functions datastream (58) has a binary bandwidth of 2.056 Mbits for transport on the DS-1 medium at a ternary symbol rate of 1.544 Mbits per second.

17. The apparatus of claim 15, wherein the VT-1.5 transport overhead datastream has a bandwidth of 320 kbits, the transport medium is HDSL and the HDSL framing functions datastream (58) has a bandwidth of 32 kilobits, and the VT-1.5 payload plus transport overhead plus HDSL framing functions datastream (58) has a binary bandwidth of 2.080 Mbits for transport on the HDSL medium at a 2B/1Q symbol rate of 1.040 Mbits per second.

18. The apparatus of claim 15, wherein the VT-1.5 transport overhead datastream has a bandwidth of 192 kbits, the transport medium is E1 and the E1 framing functions datastream (58) has a bandwidth of 128 kbits, and the VT-1.5 payload plus transport overhead plus E1 framing functions datastream (58) has a binary bandwidth of 2.048 Mbits for transport on the E1 medium at a ternary symbol rate of 2.048 Mbits per second.

19. The apparatus of claim 13, wherein the size VT-N is size VT-2/TU-12.

20. The apparatus of claim 19, wherein the VT-2/TU-12 datastream (44) has a bandwidth of 2.304 Mbits.

21. The apparatus of claim 20, wherein the VT-2/TU12 transport overhead datastream has a bandwidth of 256 kilobits, the transport medium is E1 and the E1 framing/CRC/signaling functions datastream has a bandwidth of 128 kilobits, and the VT-2/TU-12 payload plus transport overhead plus E1 framing functions datastream (58) has a binary bandwidth of 2.688 Mbits for transport on the E1 medium at a ternary symbol rate of 2.048 Mbits per second.

22. The apparatus of claim 20, wherein the VT-2/TU-12 transport overhead datastream has a bandwidth of 256 kilobits, the transport medium is HDSL and the HDSL framing functions datastream has a bandwidth of 32 kilobits, and the VT-2/TU-12 payload plus transport overhead plus HDSL framing functions datastream (58) has a binary bandwidth of 2.592 Mbits for transport on the HDSL medium at a 2B/1Q symbol rate of 1.296 Mbits per second.

* * * * *

UNITED STATES PATENT AND TRADEMARK OFFICE
CERTIFICATE OF CORRECTION

PATENT NO. : 5,579,323
DATED : November 26, 1996
INVENTOR(S) : D. Krisher

It is certified that error appears in the above-indentified patent and that said Letters Patent is hereby corrected as shown below:

```
At column 2, line 6, please cancel "DST-1" and
substitute --DS-1-- therefor.
```

Signed and Sealed this

Fifteenth Day of April, 1997

Attest:

BRUCE LEHMAN

Attesting Officer     Commissioner of Patents and Trademarks

UNITED STATES PATENT AND TRADEMARK OFFICE
CERTIFICATE OF CORRECTION

PATENT NO.  : 5,579,323
DATED       : November 26, 1996
INVENTOR(S) : D. Krisher It is certified that error appears in the above-indentified patent and that said Letters Patent is hereby corrected as shown below:

At column 4, line 63, please cancel FIGS. 4a-b" and substitute --FIG. 4-- therefor.

At column 5, line 12, please cancel "FIGS. 8a-b" and substitute --FIG. 8-- therefor.

Signed and Sealed this

Twentieth Day of May, 1997

*Attest:*

BRUCE LEHMAN

*Attesting Officer*  *Commissioner of Patents and Trademarks*